Sept. 19, 1950 N. E. LINDENBLAD 2,522,880
INDICATING SYSTEM FOR RADAR DIRECTION FINDERS
Filed Dec. 14, 1946 2 Sheets-Sheet 1
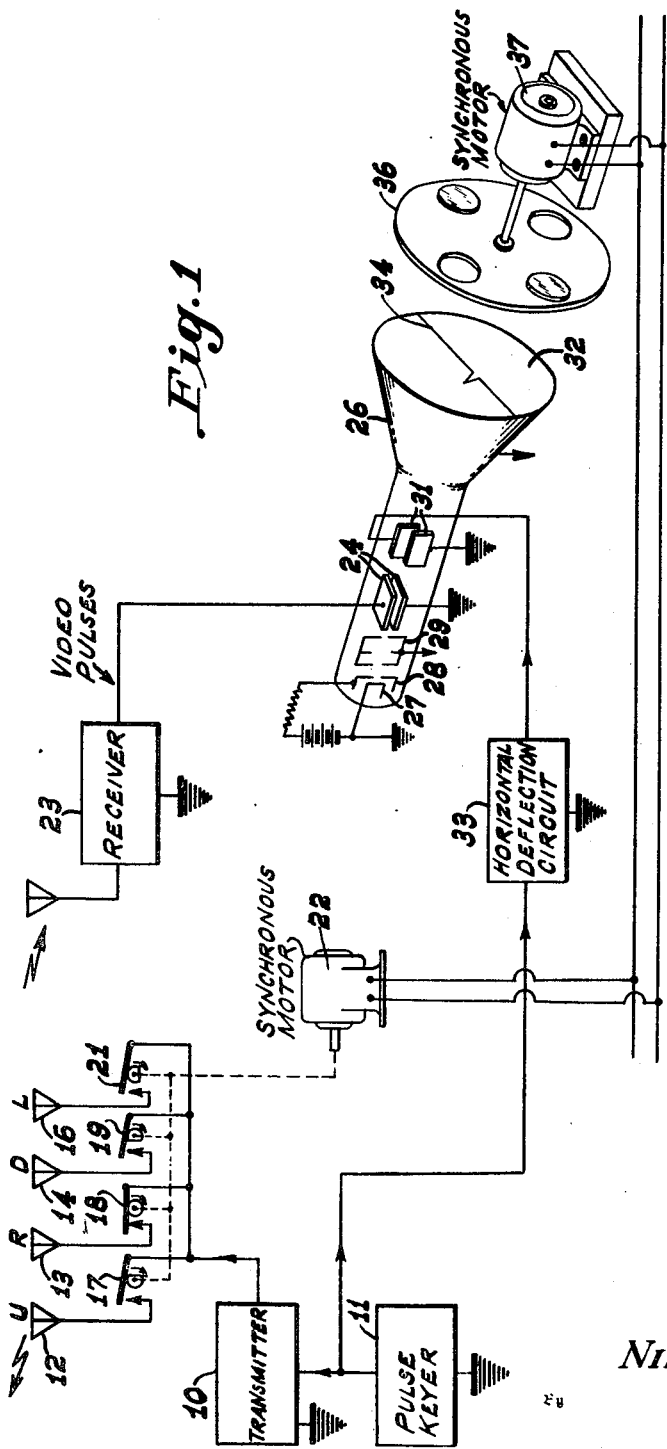
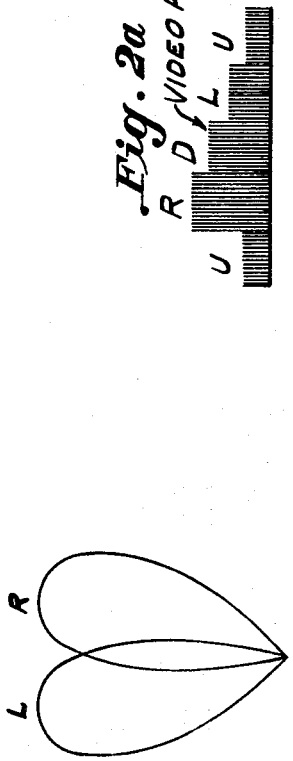
Inventor
NILS E. LINDENBLAD
Attorney

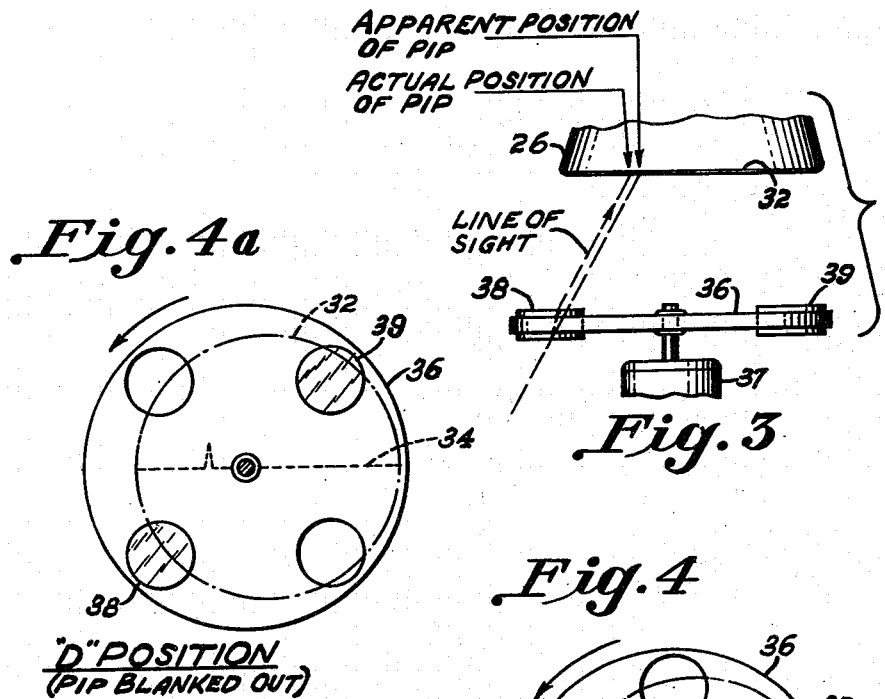
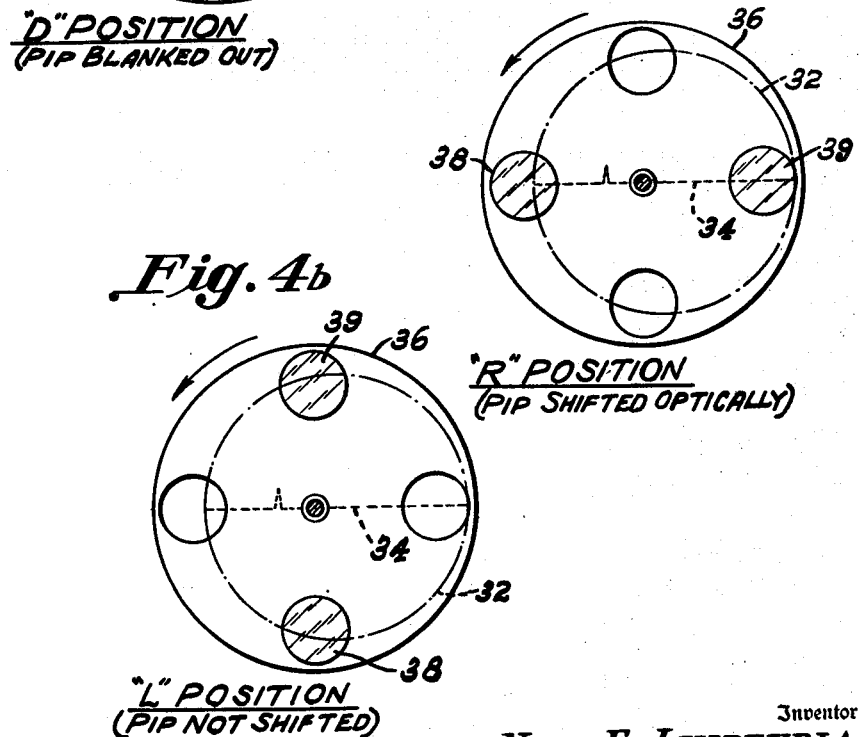

Patented Sept. 19, 1950

2,522,880

UNITED STATES PATENT OFFICE 2,522,880

INDICATING SYSTEM FOR RADAR DIRECTION FINDERS

Nils E. Lindenblad, Port Jefferson, N. Y., assignor to Radio Corporation of America, a corporation of Delaware Application December 14, 1946, Serial No. 716,213

3 Claims. (Cl. 343—16)

My invention relates to radar apparatus and particularly to indicating means for causing two target indications or pips to appear side by side whereby an observer will know that the directive antenna system of the radar apparatus is pointing directly toward the target when the two pips are of equal amplitude.

It has been the usual practice in radar systems employing lobe switching or the like to cause a pair of pulses to appear side by side instead of appearing superimposed by utilizing an electrical switching circuit for displacing the start of a timing sweep. For example, where left and right radiation pattern lobes are being radiated alternately, the indication pips corresponding to the left lobe and right lobe switching periods, respectively, are displaced with respect to each other by delaying the start of the timing sweep for one of the switching periods.

An object of the present invention is to provide an improved method of and means for causing echo indications or pips to appear side by side in a radar system.

A further object of the invention is to provide an optical system for causing successively occurring echo indications or pips to appear as a pair of pips displaced with respect to each other.

A further object of the invention is to provide an improved indicating system for radar apparatus employing lobe switching or the like.

A still further object of the invention is to provide an improved indicating system for radar apparatus employing up, down, right, left lobe switching or the like.

The invention will be described as applied to a pulse-echo radar system employing lobe switching where the switching sequence is up, right, down, left. The echo pulses from a particular target appear as a pip on the timing sweep of a cathode ray tube and the pip produced during one switching period will appear superimposed on the pip of another switching period because of persistence of vision unless steps are taken to avoid such an effect. According to a preferred embodiment of the present invention, the pips on the cathode ray tube screen are viewed alternately through a thick glass window in a rotating opaque disc and through an opening in the disc. The pips on the screen are viewed by looking through the glass window at an angle other than 90 degrees to the window surface whereby a pip is displaced by refraction when viewed through the glass. When the opaque disc rotates to a position where the opening is in front of the observer's eye, the pip is viewed directly and is not displaced. Thus, the observer sees two pips side by side.

The rotating opaque disc is synchronized with the lobe switching whereby the observer looks through the glass window during one switching period (such as for the left lobe) and through the disc opening during another switching period (such as for the right lobe). In the example to be described, the pips produced during the up and down switching periods are not seen by the observer because they are masked off by the opaque portions of the rotating disc. A similar arrangement with appropriate synchronization of the rotating disc and lobe switching is employed for viewing the up, down pips.

The invention will be better understood from the following description taken in connection with the accompanying drawing in which Figure 1 is a block and schematic diagram showing the invention applied to a pulse-echo radar system employing up, down, right, left lobe switching.

Figure 2 is a view showing the radiation pattern lobes for the left and right switching periods, Figure 2a is a graph illustrating the kind of signal that may be received during a lobe switching sequence, Figure 3 is a plan view of a portion of the apparatus shown in Fig. 1, and Figures 4, 4a and 4b are end views of the rotating disc and of the cathode ray tube screen with the disc shown in three different positions.

In the several figures similar parts are indicated by similar reference characters.

Fig. 1 shows a pulse-echo radar system comprising a radio pulse transmitter 10 which is pulse modulated by pulses produced by a pulse keying circuit 11. The pulses may occur at the rate of several thousand per second and each have a duration of several microseconds in accordance with conventional practice.

The pulses of R.-F. energy are radiated successively from directive antennas 12, 13, 14 and 16. The antennas 13 and 16 have radiation patterns in the horizontal plane as shown in Fig. 2 at R and L, respectively, which are overlapping lobes. The antennas 12 and 14 have similar overlapping lobe patterns in the vertical plane. The pairs of antennas 13, 16 and 12, 14 are mounted by means not shown for movement in azimuth and in elevation, respectively, whereby the antenna assembly may be pointed directly toward a target.

The antennas 12, 13, 14 and 16 are connected successively to the pulse transmitter 10 by means of cam operated switches 17, 18, 19 and 21 which are operated by a synchronous motor 22. The speed of switching may be at the rate of 60 complete switching cycles or sequences per second for example.

Radio pulses reflected by a target are received and demodulated by a receiver 23 and applied to the vertical deflecting plates 24 of a cathode ray indicator tube 26. Fig. 2a shows the character of the video pulses that may be applied to the deflecting plates 24 during a particular switching cycle. In this example it can be seen from the relative amplitudes of the pulses received in the different switching periods that the antenna assembly is pointed above the target and to the left during said particular switching cycle.

The cathode ray tube 26 is of conventional design and includes a cathode 27, a control grid 28, an anode 29, the vertical deflecting plates 24, a pair of horizontal deflecting plates 31, and a phosphorescent screen 32. However, the tube 26 should be of the short persistence type, i. e., the photographic type, since a long or even normal, persistence screen will fail to show pip amplitude differences corresponding to right-left or up-down lobes. The short persistence or instantaneous screen gives very good results.

A sawtooth deflecting wave is applied to the plates 31 from a horizontal deflecting circuit 33 which is synchronized with the pulse transmission by pulses supplied from the pulse keyer 11. Thus the time sweep trace shown at 34 starts at substantially the instant a radio pulse is transmitted.

As shown in Figs. 1 and 3, the apparatus for causing the left, right or the up, down pips to appear as a pair of pips comprises a rotatable opaque disc 36 driven by a synchronous motor 37. The disc 36 has four apertures therein which are equally spaced around the periphery of the disc. Two of the diametrically opposed apertures have thick glass windows 38 and 39 therein so that if a pip on the screen 32 is viewed therethrough at an angle other than 90 degrees, the pip will appear displaced due to refraction as illustrated in Fig. 3.

The operation of the viewing system can best be understood by referring to Figs. 4, 4a and 4b. In Fig. 4, the window 38 has rotated into a position opposite the observer's eye so that the pip on the screen 32 is seen as shown in Fig. 3 apparently displaced to the right. At this time the right-lobe antenna 13 is radiating signal so that the amplitude of the pip is a function of the target position with respect to the left-lobe radiation pattern.

Next, the down-lobe antenna 14 is switched to radiate signal. During this switching period an opaque section of the disc 36 is in front of the observer's eye as shown in Fig. 4a so that the pip produced during the down-lobe switching period is not seen.

Next, the left-lobe antenna 16 is switched to radiate signal. During this switching period an aperture in the disc 36 is in front of the observer's eye as shown in Fig. 4b whereby the pip produced during the left switching period is viewed directly and is seen in its actual position. Due to persistence of vision, the directly viewed pip and the optically displaced pip appear as two pips side by side.

During the last switching period of the switching cycle, the up-lobe antenna 12 radiates signal and the pip produced on the screen 36 during this period is masked off by an opaque section of the disc 36.

From the foregoing description it will be apparent that the observer sees only the pips produced by radiation of the right and left lobe signals and that the two pips appear side by side so that they may be compared as to amplitude. By moving the antenna assembly in azimuth until the two pips are of equal amplitude, the observer can point said assembly directly toward the target in azimuth.

The viewing system for the elevation indication is the same as the one for azimuth except that the phasing of the opaque disc 36 is changed so that the "up," "down" pips are seen and the "left," "right" pips are masked out. A separate cathode ray tube and optical viewing mechanism may be employed or the phasing of the optical assembly illustrated may be changed when it is desired to view the "up," "down" pips. The desired phase change for this purpose may be obtained by rotating the motor 37 about its longitudinal axis by 45 degrees.

It should be understood that the directive antenna assembly illustrated may be employed for receiving instead of transmitting, in which case the radio signal is transmitted from a non-directed antenna. Or, the directive antenna assembly may be employed for both transmitting and receiving by employing suitable well known antenna duplexing means.

I claim as my invention:

1. In combination, a cathode ray tube having a screen on which successive indications are caused to appear during successive time periods and in substantially superimposed relation, optical means comprising a refractive element mounted on a rotatable opaque disc for causing an indication produced during one of said time periods to appear displaced on said screen when said element is moved into a viewing position, said disc having a non-refracting window therein for causing an indication produced during a succeeding time period to appear displaced a zero amount when said non-refracting window is moved into a viewing position whereby said two indications appear to an observer to be a pair of indications.

2. In combination, a cathode ray tube having a screen on which successive indications are caused to appear during successive time periods and in substantially superimposed relation, optical means comprising two refractive elements mounted in diametrically opposed relation on a rotatable opaque disc for causing an indication produced during one of said time periods to appear displaced on said screen when one of said elements is moved into a viewing position, said disc having two non-refracting windows therein displaced 90 degrees with respect to said refractive elements for causing an indication produced during a succeeding time period to appear displaced a zero amount when one of said non-refracting windows is moved into a viewing position whereby said two indications appear to an observer to be a pair of indications.

3. In combination, a cathode ray tube having a screen on which successive indications are caused to appear during four successive time periods and in substantially superimposed relation, optical means comprising two refractive elements mounted in diametrically opposed relation on a rotatable opaque disc for causing an indication produced during one of said time periods to appear displaced on said screen when one of said elements is moved into a viewing position, said disc having two non-refracting windows therein displaced 90 degrees with respect to said refractive elements for causing an indication produced during the second succeeding time period to appear displaced a zero amount when said non-refracting window is moved into a viewing position whereby said two indications appear to an observer to be a pair of indications, the indications occurring during the other two time periods being masked off by the opaque sections of said disc.

NILS E. LINDENBLAD.

REFERENCES CITED

The following references are of record in the file of this patent:

UNITED STATES PATENTS

| Number | Name | Date |
|---|---|---|
| 1,745,107 | Mendoza | Jan. 28, 1930 |
| 2,208,209 | Busignies | July 16, 1940 |
| 2,406,798 | Burroughs | Sept. 3, 1946 |
| 2,416,088 | Deerhake | Feb. 18, 1947 |
| 2,418,143 | Stodola | Apr. 1, 1947 |
| 2,421,663 | Tolson | June 3, 1947 |
| 2,422,361 | Miller | June 17, 1947 |
| 2,426,979 | Ayres | Sept. 8, 1947 |